Figure 1:
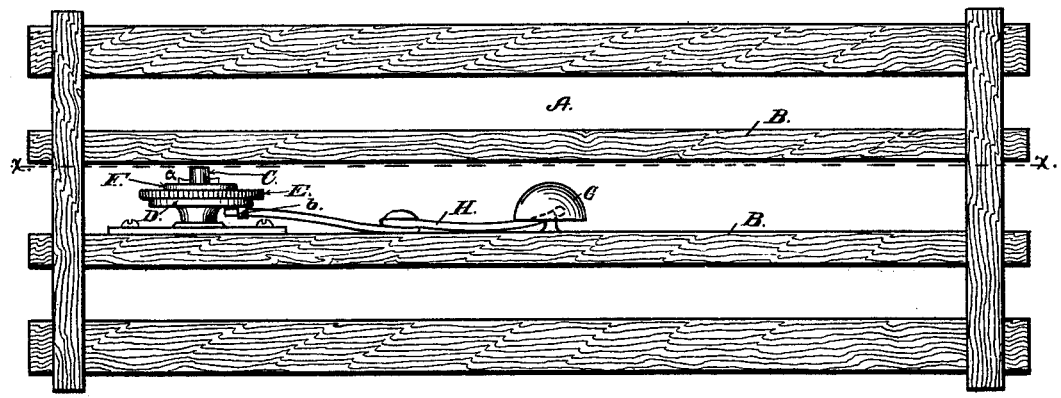

B. SMITH.
Registering Device for Baling-Presses.

No. 218,645. Patented Aug. 19, 1879.

Witnesses:
Chas. W. Peck
P. H. Gunckel

Inventor:
Benjamin Smith
by Peck & Ritchie
his Attys

UNITED STATES PATENT OFFICE.

BENJAMIN SMITH, OF DAYTON, OHIO, ASSIGNOR OF ONE-HALF HIS RIGHT TO McCAUSLAND & CO., OF SAME PLACE.

IMPROVEMENT IN REGISTERING DEVICES FOR BALING-PRESSES.

Specification forming part of Letters Patent No. 218,645, dated August 19, 1879; application filed February 15, 1879.

*To all whom it may concern:*

Be it known that I, BENJAMIN SMITH, of Dayton, in the county of Montgomery and State of Ohio, have invented certain new and useful Improvements in Registering Devices for Baling-Presses; and I do hereby declare the following to be a full, clear, and exact description of the same.

This invention relates to that class of baling-presses which are designated "perpetual presses," in which the material to be baled is continually being fed into the press, and in which the finished bales follow each other uninterruptedly from its discharge-opening. As a class these machines have a horizontal baling or compressing chamber long enough to contain several finished bales, into the rear end of which a ram or plunger works to compress the in-fed hay or cotton. When the first bale is formed a division-piece or head is placed in the chamber, and rests against the rear end of the finished bale, and more material is fed in for the construction of the second bale, which is compressed against the first bale, which furnishes the proper resistance, and so on, in succession, one bale after another is formed.

The desideratum in these machines is to get the bales as nearly equal in size and weight as possible. To effect this it has heretofore been necessary to station an attendant at the side of the baling-chamber, which, being formed of open slat-work, permits the contents to be easily seen from without. When the end of the bale being formed reaches a certain point in the chamber the attendant is required to notify the feeder, who then ceases feeding and places in a head-piece, against which to compress and form a new bale.

My improvement is an automatic alarm or registering device, which dispenses with the services of such attendant and notifies the feeder when to stop and put in a dividing-piece.

It consists, essentially, of a toothed disk of an ascertained diameter inserted through the baling-chamber so that the toothed periphery comes into contact with the moving bales, which as they move turn the disk. Upon the face of the disk is a projecting pin, which, at every revolution of the disk, moves a lever-arm that is suitably connected to a bell, and causes an alarm to be given, which notifies the feeder to place in a division-piece and start a new bale.

The novelty consists in applying to a baling-press an automatic registering device which is operated by the passage of the material being baled through the baling-chamber, whereby an alarm is given by a bell or other sounding device when the bale shall have traveled a certain ascertained distance, as will be hereinafter set forth and specifically claimed.

Figure 2:
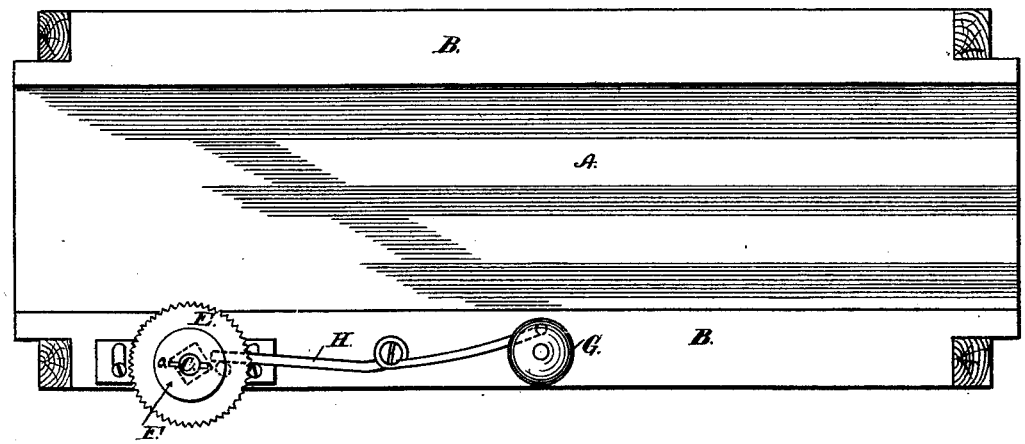

In the accompanying drawings, Figure 1 represents a side view, in elevation, of a baling-chamber, showing the application of my invention. Fig. 2 is a plan view through the lines $x\ x$ of Fig. 1.

A is the compression or baling chamber, which, in presses of this class, is a rectangular box, having its sides usually formed of parallel horizontal slats B, as shown. Upon the upper side of one of these slats, about halfway between the top and bottom of the chamber, near its discharge end, I secure an upright adjustable standard-shaft, C, upon which a horizontal sleeved disk, D, fits, so as to revolve freely thereon. The base of the standard is provided with transverse slots, through which bolts pass to secure it to the rail or slat B, and by means of which the adjustment of the shaft C is effected.

Upon the top side of the disk D, at its center, is an integral nut, which passes through a correspondingly-shaped eye in a toothed disk, E, which last rests concentrically upon the disk D, as shown. This removable disk E is held from displacement either by means of a nut screwed down over the top of the shaft C, or else it is held in place, as shown, by a third disk, F, secured by a key, *a*.

G is a bell of any suitable construction, fastened on the rail B, as shown, and having its striker connected to a lever-arm, H, whose opposite end terminates just under the disk D, as indicated. This latter disk has projecting from its under side a pin or other equivalent device, *b*, which, at every revolution of the disk, moves the arm H and causes the bell to sound.

The operation of my improvement is as follows: We will suppose it is required to form bales of about twenty-seven inches in length. To this end a toothed disk, E, of about nine inches in diameter, is secured upon the disk D, so as to revolve easily therewith, and it is adjusted so that its toothed periphery projects slightly within the baling-chamber, as in Fig. 2. Now, as the material in the chamber moves toward the discharge-orifice at each successive stroke of the ram it engages with the toothed disk, and turns it gradually until the pin $b$ moves the lever H and sounds the bell. The feeder is thus notified to put in a division-piece, and a new bale is started, and the same operation is repeated. By this means, when the material in the press has traveled a distance exactly equal to the circumference of the toothed disk, the bell is sounded to notify the feeder of that fact, and in this way the length of the bales is made uniform.

To vary the lengths of the bales it is only necessary to put disks of ascertained diameter (a number of which might be furnished along with each machine) upon the revolving disk D, and adjust them by moving the standard C in or out, so that the periphery of the disk employed projects slightly within the baling-chamber, as before stated.

By making the toothed disks interchangeable, as I have described, any desired length of bale may be obtained. The same result could be reached by making an expansible toothed disk composed of sections which could be adjusted with respect to each other.

It is obvious that the location of the bell may be varied almost infinitely. Consequently I do not wish to be limited to the precise location or arrangement and construction here shown; but What I do claim is as follows:

In combination with a baling-press, a toothed disk or wheel projecting within the baling-chamber, and connected with an alarm, whereby said disk or wheel is caused to turn by the passage of the material being baled, and whereby said alarm is automatically sounded.

Witness my hand this 15th day of January, A. D. 1879.

BENJAMIN SMITH.

Witnesses:
PATRICK H. GUNCKEL,
CHAS. M. PECK.